(12) United States Patent
Kosuge et al.

(10) Patent No.: US 6,856,749 B2
(45) Date of Patent: Feb. 15, 2005

(54) OPTICAL COUPLING AND ALIGNMENT DEVICE

(75) Inventors: Michikazu Kosuge, Tokyo (JP); Hirokazu Tamura, Wellesley, MA (US)

(73) Assignee: Fitel Technologies, Inc., Clinton, NJ (US)

( * ) Notice: Subject to any disclaimer, the term of this patent is extended or adjusted under 35 U.S.C. 154(b) by 0 days.

(21) Appl. No.: 10/268,428

(22) Filed: Oct. 10, 2002

(65) Prior Publication Data

US 2004/0071430 A1 Apr. 15, 2004

(51) Int. Cl.⁷ .............................................. G02B 6/00
(52) U.S. Cl. ........................... 385/137; 385/33; 385/88
(58) Field of Search ........................... 385/137, 16–18, 385/33, 88

(56) References Cited

U.S. PATENT DOCUMENTS

| | | | |
|---|---|---|---|
| 4,439,221 A | 3/1984 | Smyth et al. ................. 65/4.21 |
| 4,474,469 A | 10/1984 | Abe ............................. 356/399 |
| 4,497,536 A | * 2/1985 | Payne et al. .................... 385/61 |
| 4,701,011 A | 10/1987 | Emkey et al. ............ 350/96.18 |
| 4,744,623 A | 5/1988 | Prucnal et al. ............. 350/96.2 |
| 4,881,789 A | 11/1989 | Levinson ................ 350/96.15 |
| 4,998,807 A | * 3/1991 | Uzawa et al. ................ 359/654 |
| 5,185,836 A | * 2/1993 | Baker ............................. 385/61 |
| 5,217,568 A | 6/1993 | Tessier et al. ............ 156/659.1 |
| 5,257,332 A | 10/1993 | Pimpinella .................... 385/59 |
| 5,293,438 A | * 3/1994 | Konno et al. ................... 385/35 |
| 5,304,874 A | 4/1994 | Vinal ........................... 307/530 |
| 5,351,328 A | 9/1994 | Kakii et al. .................... 385/83 |
| 5,384,874 A | 1/1995 | Hirai et al. .................... 385/34 |
| 5,384,878 A | 1/1995 | Osaka et al. ................... 385/96 |
| 5,446,810 A | * 8/1995 | Watanabe et al. ............. 385/22 |
| 5,487,121 A | 1/1996 | Miesak ........................ 385/39 |
| 5,500,389 A | 3/1996 | Lee et al. ...................... 437/90 |
| 5,519,798 A | 5/1996 | Shahid et al. ................. 385/65 |
| 5,757,993 A | * 5/1998 | Abe .............................. 385/34 |
| 5,854,867 A | 12/1998 | Lee et al. ...................... 385/49 |
| 6,027,255 A | 2/2000 | Joo et al. ....................... 385/88 |
| 6,052,178 A | 4/2000 | Hirano ...................... 356/73.1 |
| 6,154,586 A | 11/2000 | MacDonald et al. .......... 385/18 |
| 6,160,929 A | * 12/2000 | Takahashi ..................... 385/21 |
| 6,195,485 B1 | 2/2001 | Coldren et al. ............... 385/49 |
| 6,215,946 B1 | 4/2001 | Sherrer ....................... 385/137 |
| 6,246,812 B1 | * 6/2001 | Liu et al. ...................... 385/34 |
| 6,253,004 B1 | 6/2001 | Lee et al. ...................... 385/31 |
| 6,275,320 B1 | 8/2001 | Dhuler et al. ............... 359/237 |
| 6,278,812 B1 | * 8/2001 | Lin et al. ...................... 385/18 |

(List continued on next page.)

FOREIGN PATENT DOCUMENTS

EP    0 611 975 B1    9/1999

OTHER PUBLICATIONS

Emkey, W.L. et al. "Analysis and evaluation of graded–index fiber–lenses" *Journal of Lightwave Technology* LT–5(9):1156–64 (Sep. 1987).

(List continued on next page.)

*Primary Examiner*—Ellen E. Kim
(74) *Attorney, Agent, or Firm*—Lahive & Cockfield, LLP

(57) ABSTRACT

An optical device, such as optical coupling devices, optical switches, optical isolators, optical attenuators, laser diodes, photo diodes are provided having a substrate with a groove in order to locate a optical fiber. A lens, such as a graded index lens, is secured to the end of the optical fiber, with the lens located outside the groove, thereby avoiding difficulties with axial alignment of the lens caused by the interface of the optical fiber to the lens. In one implementation, the groove in the prototype is a V-groove, thereby providing stable positioning of the optical fiber within the groove.

9 Claims, 10 Drawing Sheets

U.S. PATENT DOCUMENTS

| | | |
|---|---|---|
| 6,316,281 B1 | 11/2001 | Lee et al. ................... 438/31 |
| 6,381,386 B1 | 4/2002 | Nishikawa .................. 385/32 |
| 6,396,980 B1 | 5/2002 | Liu et al. ..................... 385/34 |
| 6,402,390 B1 | 6/2002 | Anderson et al. ............. 385/71 |
| 6,430,351 B1 | 8/2002 | Takahashi et al. .......... 385/137 |
| 6,441,944 B1 * | 8/2002 | Kim et al. .................. 359/281 |
| 6,449,406 B1 * | 9/2002 | Fan et al. .................... 385/17 |
| 6,632,025 B2 * | 10/2003 | Ukrainczyk ................. 385/70 |
| 6,633,700 B2 * | 10/2003 | Bellman et al. ............... 385/33 |
| 6,636,683 B2 * | 10/2003 | Morimoto et al. ......... 385/140 |

OTHER PUBLICATIONS

Madou, Marc J. "Wet Bulk Micromachining" pp. 163–187 in *Fundamentals of Microfabrication* CRC Press LLC (1997).

Marcuse, D. "Loss analysis of single–mode fiber splices" *The Bell System Technical Journal* 56(5):703–18 (May–Jun. 1977).

OMM, Inc. "OMM 4×4 :4×4 Photonic Switch: Product Brief" 2 pp. (2002).

Zygo Corporation "Zygo TeraOptix's Silicon Optical bench Packaging Evaluation Kit" 2 pp (2001).

Zygo Corporation "Zygo TeraOptix's Fiber Arrays offer exceptional uniformly over a wide range of fiber diameters, placement positions and fiber counts" 4 pp. (2001).

* cited by examiner

FIG. 4
Diameter of Spliced Portion
| in first direction (μm) | in second direction (μm) |
|---|---|
| 127.2 | 127.0 |
| 127.7 | 126.9 |
| 127.4 | 127.5 |
| 127.8 | 127.6 |
| 127.9 | 127.0 |
| 126.9 | 127.0 |
| 126.6 | 127.5 |
| 126.5 | 126.6 |
| 125.6 | 125.4 |
FIG. 5
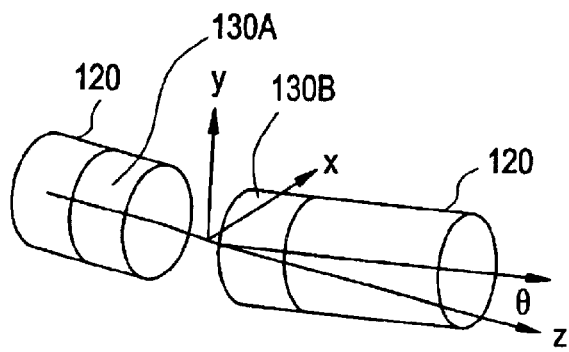
FIG. 6
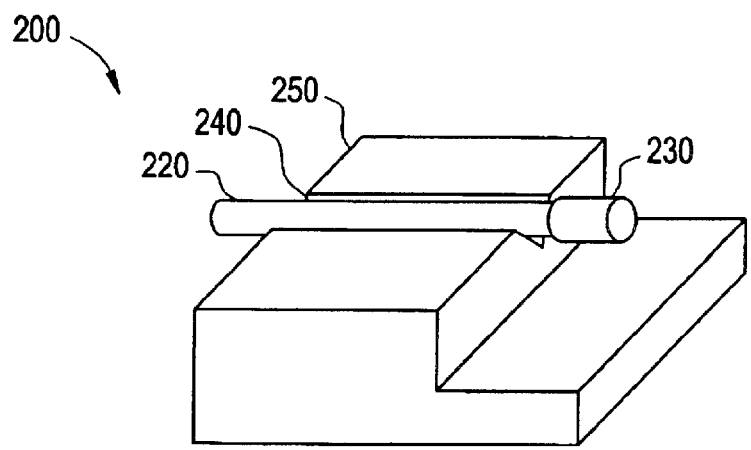

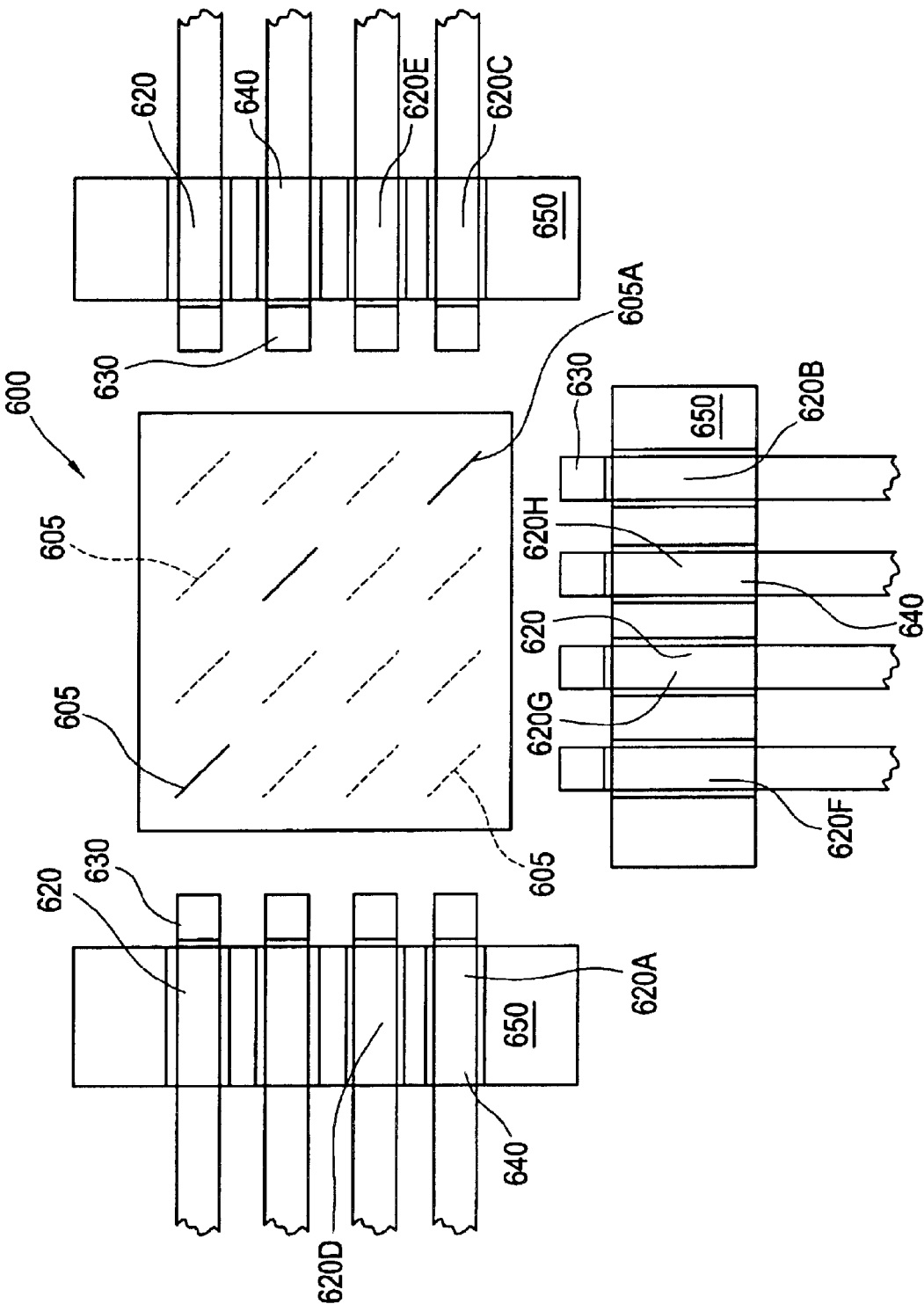

OPTICAL COUPLING AND ALIGNMENT DEVICE

TECHNICAL FIELD

The present invention relates generally to optical devices. Examples of optical devices include optical coupling devices, optical switches, optical isolators, optical attenuators, laser diodes, photo diodes and other devices involving optical fibers.

BACKGROUND

The use of optical signals for communication and signal transmission has become commonplace. Typically, in the design of an optical network, additional expense and complexity is incurred because of signal loss at coupling locations. Additionally, because of signal loss, additional amplifiers and other devices are often added, thereby increasing noise levels and reducing efficiency.

One method of coupling optical signals between two optical fibers is shown in FIG. 1. A coupling device 100 is provided with a ball lens 110 in proximity to the end of each of the optical fibers 120. The ball lenses are typically 2–3 millimeters in diameter and are separated from each other. Typically, the diameter of the optical fiber 120 is in the neighborhood of 125 microns.

With reference to FIG. 1, difficulties reside in the assembly of coupling devices 100 in locating the ball lens 110 with respect to the optical fiber 120 and also with respect to the neighboring ball lens 110. Further difficulties arise due to the large amount of space required for the two ball lenses and associated separation distance. One example of the use of a ball lens configuration can be found in U.S. Pat. No. 5,257,332.

SUMMARY

The present invention may be adapted to position a lens coupled to an optical fiber, such that the lens can be precisely and accurately located, both in position and angle. The present invention may also minimize the effort required in configuring and assembling an optical device, while simultaneously enabling precise, accurate and reliable positioning of a lens coupled to an optical fiber.

The present invention uses a substrate having a groove in order to locate a optical fiber. A lens, such as a graded index lens, is secured to the end of the optical fiber, with the lens located outside the groove, thereby avoiding difficulties with axial alignment of the lens, such as those caused by differing diameters of the lens and the optical fiber and/or irregularities of the interface of the optical fiber to the lens. In one implementation, the groove is a V-groove, thereby providing stable positioning of the optical fiber within the groove.

According to one embodiment of the invention, a device is provided for alignment of a lens. The device includes a substrate having a groove in which an optical fiber is located. A lens is mounted to the end of the optical fiber, such that the lens is located out of the groove and is held in position by the fiber.

According to another embodiment of the invention, an optical coupling device is provided with a first substrate. The first substrate has a groove in which an optical fiber is located. A lens is mounted to the end of the optical fiber such that the lens is located out of the groove and is held in position by the fiber. A second substrate is also provided having a second groove. Another optical fiber is located in the second groove and another lens is mounted to an end of the optical fiber in the second groove, such that the lens is located out of the second groove and is held in position by the second fiber. According to this embodiment of the invention, the lenses face each other. Optionally, the first substrate and second substrate may be a continuous substrate.

According to variations of embodiments of the invention, an optical isolator may be located between the first lens and the second lens to allow light to pass from said first lens to said second lens and inhibit back reflection light. Another variation involves an optical attenuator located between the first lens and the second lens to selectively inhibit light traveling between the first lens and the second lens.

According to another embodiment of the invention, a laser device is provided with a substrate. The substrate has a groove in which an optical fiber is located. A lens is located at an end of the optical fiber, such that the lens is located out of the groove and is held in position by the fiber. A laser is coupled to the substrate and faces the lens and is located to direct light into the fiber.

A further embodiment of the invention provides a photodetector having a substrate with a groove. An optical fiber is located in the groove with a lens having a first end mounted to the optical fiber, such that the lens is located out of the groove and is held in position by the fiber. A photodetector is coupled to the substrate and faces a second end of the lens and is located to detect light in the fiber.

A further embodiment of the invention provides an optical switch having a substrate with a groove. A first optical fiber is located in a first groove with a first lens mounted to the end of the optical fiber such that the first lens is located out of the first groove and is held in position by the first fiber. A first mirror is coupled to the substrate and is selectively located to obliquely face the first lens to be adapted to selectively redirect light travelling from the first lens.

BRIEF DESCRIPTION OF THE DRAWINGS

The invention will be apparent from the description herein and the accompanying drawings, in which like reference characters refer to the same parts throughout the different views.

FIG. 4 illustrates varying diameters of splice locations between an optical fiber and a lens.

FIG. 5 illustrates a coordinate system for purposes of discussion;

FIG. 6 illustrates an example lens positioning device according to an embodiment of the invention;

FIG. 17 illustrates an example optical switch according to an embodiment of the invention.

DETAILED DESCRIPTION

The present invention, in various embodiments, provides optical coupling devices, including lens positioning devices, optical isolators, optical attenuators, laser devices, photodetector devices and optical switches using a lens mounted to the end of an optical fiber. According to various embodiments of the invention, a substrate is provided with a groove. One or more optical fibers are located in the groove, such as a V-groove or other groove capable of inhibiting movement of the optical fiber. The lens is located out of the groove, such that the coupling of the optical fiber to the lens does not degrade the orientation of the fiber within the groove.

Figure 1:
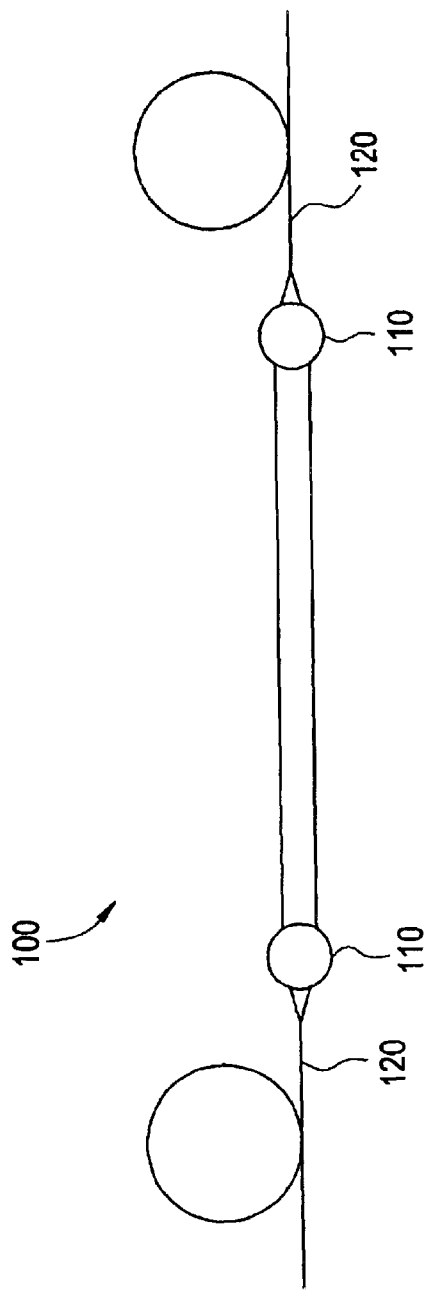
FIG. 1 illustrates a known optical coupling using ball lenses.
Figure 2:
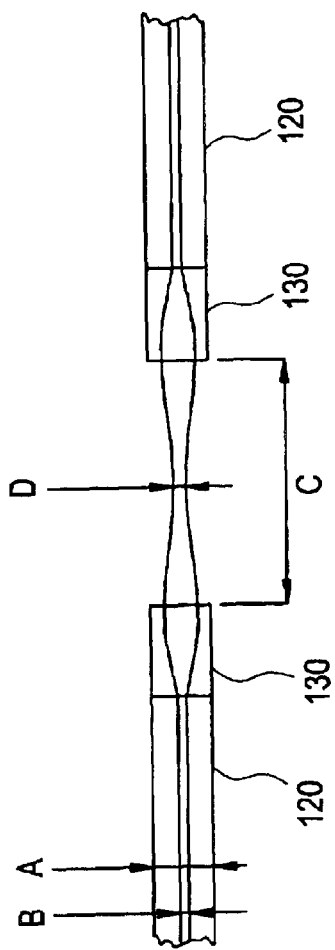
FIG. 2 illustrates an optical coupling using GRIN lenses.

An optical coupling is illustrated in FIG. 2. In this approach, the ball lens is replaced by a smaller, graded index (GRIN) lens 130. The GRIN lens 130 may also be known as a graded index fiber (GIF) lens. A good optical coupling using a GRIN lens 130 can result in less than 1 dB of signal loss. An example of the use of a GRIN lens can be found in U.S. Pat. No. 4,701,011.

The GRIN lens 130 may be provided with a diameter of approximately 125 microns, similar to the example optical fiber 120. As shown in FIG. 2, the external diameter A of the optical fiber 120 is approximately 125 microns. The core diameter B of the optical fiber is approximately 10 microns. Typically, the GRIN lens 130 is directly affixed to the optical fiber 120.

In the example configuration shown in FIG. 2, the GRIN lens 130 and optical fiber 120 assemblies have a separation distance C of approximately 3 millimeters and a beam spot size D of approximately 40–80 microns. The working distance can be less or more than 3 millimeters, and the beam spot can be less or more than 40–80 microns. These values can vary depending on characteristics of the GRIN lens 130, such as the index profile and the length of the GRIN lens 130. It is understood that the example configuration of FIG. 2 is not limiting and is merely presented for purposes of discussion of embodiments of the invention. Examples of considerations in optical fiber coupling can be found in Marcuse, D., Loss Analysis of Single-Mode Fiber Splices, *The Bell System Technical Journal,* vol 56, no. 5, May–June 1977. Examples of considerations in GRIN lens selection can be found in Emkey W. L. et al., Analysis and Evaluation of Graded-Index Fiber-Lenses, *Journal of Lightwave Technology,* vol. LT-5, no. 9, September 1987.

Figure 3A:
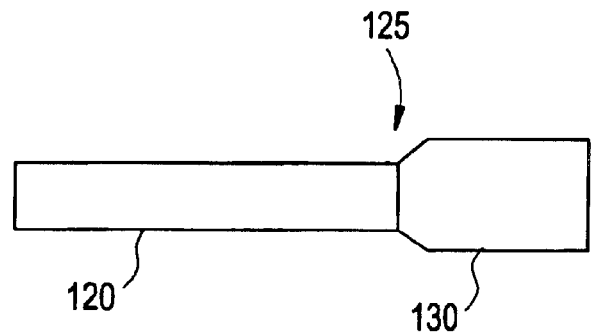
FIGS. 3A–3C illustrate various couplings of GRIN lenses to optical fibers.
Figure 3B:
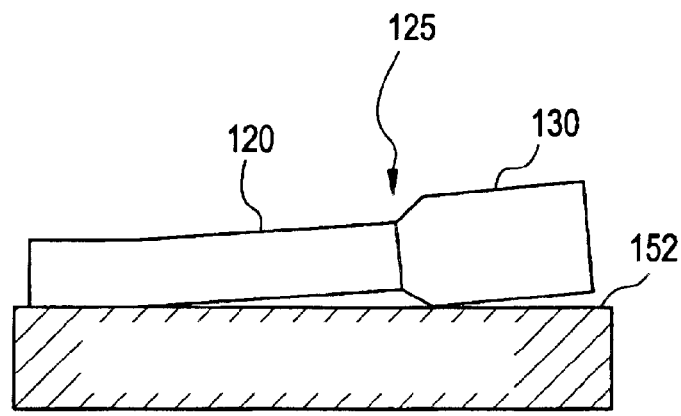

The coupling of the GRIN lens 130 and the optical fiber 120 often results in a configuration that will not lie flat along a flat surface. As shown in FIG. 3A, the diameter of the optical fiber 120 may be smaller or larger than the diameter of the GRIN lens 130. The different diameter of the GRIN lens 130 from the optical fiber 120 will likely cause the GRIN lens 130 to be located non-parallel to a flat surface 152, as shown in FIG. 3B. This may occur regardless of whether the transition 125 between the GRIN lens 130 and the optical fiber 120 is smooth, such as by tapering the GRIN lens 130 or optical fiber 120 so that the diameters match at the transition 125.

Figure 3C:
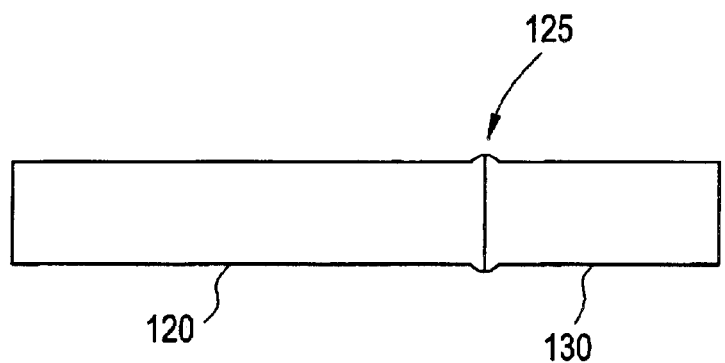

Another example of a configuration that will not lie flat along a flat surface is provided in FIG. 3C. The example shown in FIG. 3C can occur during fusion splicing or adhesive dispensing. In this example, the transition 125 where the GRIN lens 130 and optical fiber 120 are coupled has a larger diameter than either of the GRIN lens 130 or optical fiber 120, likely resulting in a non-parallel location of the GRIN lens 130 relative to a flat surface.

A further difficulty encountered with the coupling of a GRIN lens 130 and optical fiber 120 is the frequent non-round condition of the splice, or coupling location, between the GRIN lens 130 and optical fiber 120. Measurements taken by Applicants of various samples are illustrated in FIG. 4. Each row of FIG. 4 signifies a different sample. As shown in the first sample, a diameter in a first direction was measured as 127.2 microns, while the diameter of the same portion in a second direction, orthogonal to the first direction, was 127.0 microns.

One drawback of the GRIN lens 130 is that it requires precise axial alignment relative to its counterpart GRIN lens 130 in an optical coupling. In some applications, axial misalignment greater than 0.1° can result in substantial signal loss. By way of example, FIG. 5 illustrates a coordinate system for purposes of discussion of the relationship between two GRIN lenses 130A, 130B and optical fiber 120 assemblies. A z axis is provided generally along a longitudinal axis of a GRIN lens 130A. The angle θ illustrates the axial orientation of GRIN lens 130B relative to GRIN lens 130A. Further axes, the x axis and the y axis, are provided to form a three-dimensional Cartesian coordinate system with the z axis. As shown in FIG. 5, the x axis and y axis are orthogonal to each other and the z axis.

In the example configuration shown in FIG. 2, the tolerances for a coupling loss of less than 1 dB require that the GRIN lenses 130 be placed ±5 microns in the x and y directions. Substantial flexibility exists in placement along the z axis, as the GRIN lenses 130 are to be located ±400 microns of their focusing locations in the example. In view of the parameters specified, θ needs to be ±0.1° in order to maintain coupling loss of less than 1 dB. These tolerances for θ assume the 40 micron beam spot size, illustrated by the letter D in FIG. 2, and a 3 millimeter separation distance C. It is understood that the example configuration of FIG. 2 is not limiting and is merely presented for purposes of discussion of embodiments of the invention.

A lens positioning device 200, according to an example of an embodiment of the invention, is shown in FIG. 6. A lens 230 is mounted to an optical fiber 220. The optical fiber 220 is located in a groove 240 of a substrate 250. According to the invention, the lens 230 is located outside of the groove 240. The lens 230 is mounted to the optical fiber 220.

Figure 7:
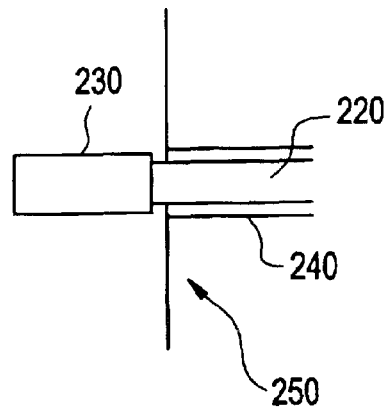
FIG. 7 illustrates a close-up view of the device of FIG. 6.
Figure 7A:
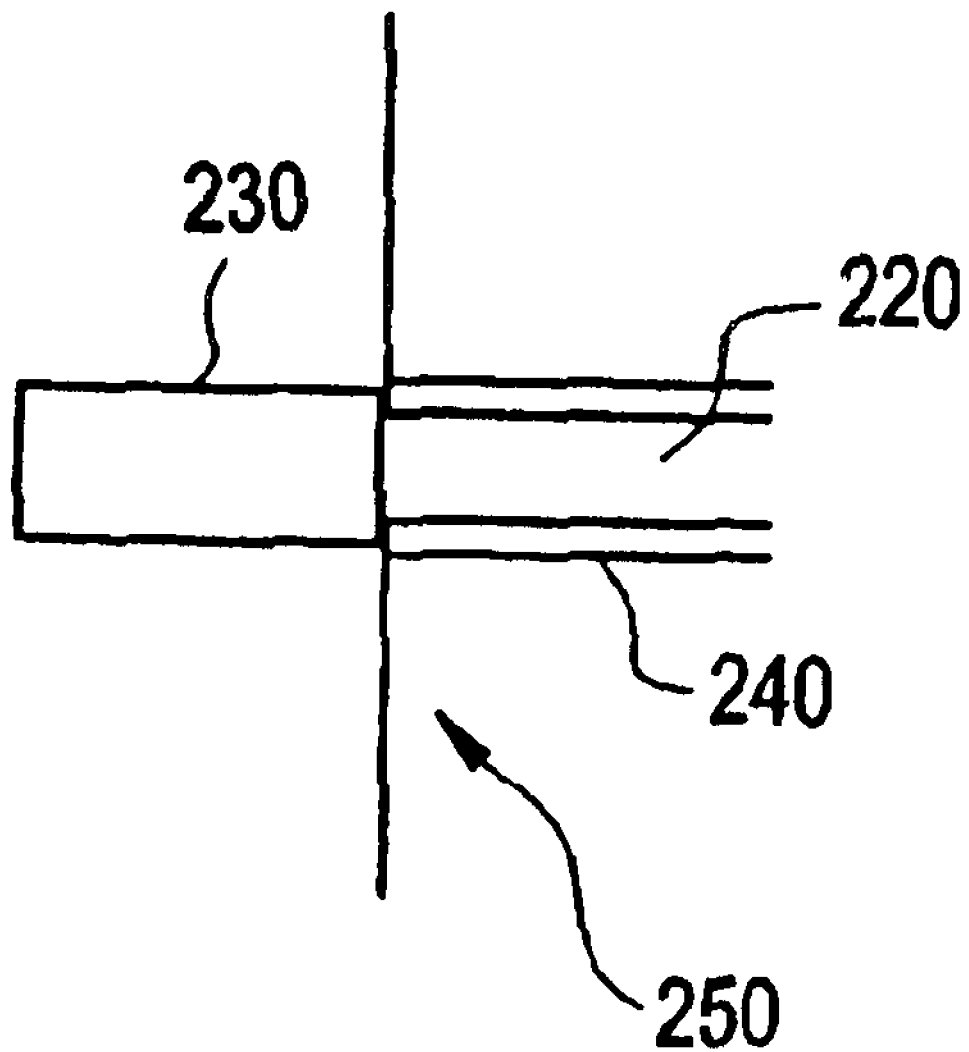
FIG. 7A illustrates a close-un view of a variation of the device of FIG. 6.

FIG. 7 provides a top view of the end of the groove 240. Although the lens 230 is illustrated as located a short distance from the end of the groove 240, the invention is not so limited. The lens 230 may be located at the end of the groove 240k optionally contacting the substrate 250, or may be a greater or lesser distance than illustrated from the end of the groove 240. FIG. 7A illustrates an example of the lens 230 contacting the substrate 250.

Figure 8:
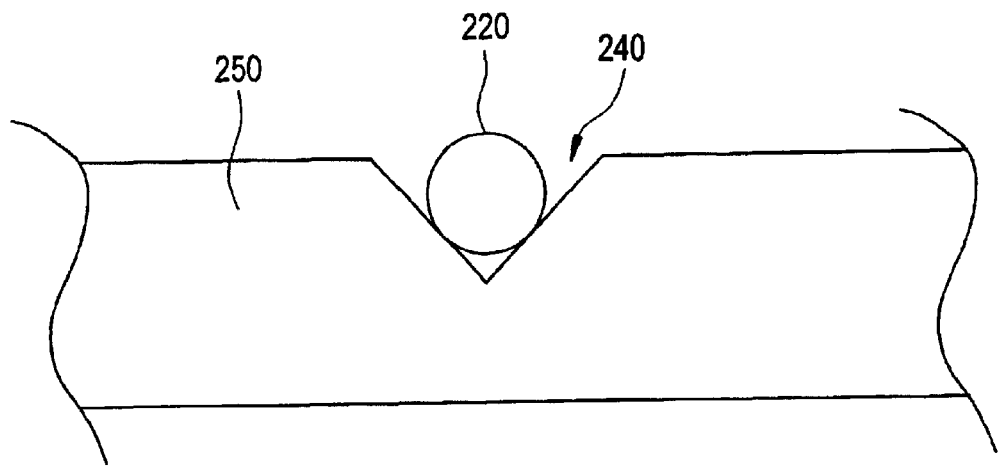
FIGS. 8 and 9 illustrate cross-sectional views of grooves according to examples of the invention.
Figure 9:
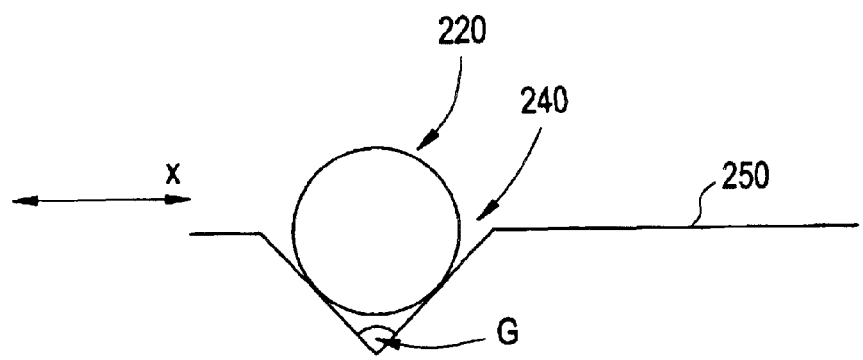

The groove 240 may be formed in the substrate 250 according to a wide variety of methods known in the art. One example is a V-groove 240, as shown in FIGS. 8 and 9. A V-groove is well suited to the invention, as the V-groove helps to locate the optical fiber 220 by inhibiting movement of the optical fiber in an x direction. The V-groove shape also serves to align the optical fiber along the direction of the groove, by contacting the optical fiber at two locations along its circumference.

As shown in FIG. 8, the optical fiber 220 may be located all or substantially within the groove 240, when viewed in cross-section. FIG. 9 illustrates a groove 240 in which the optical fiber 220 is located partially outside of the groove 240 in cross-section. The optical axis of the optical fiber 220 may optionally be located within a plane formed by the upper surface of the substrate 250. By way of example, angle G may optionally vary between 60° and 70°, or may be any angle such that the optical fiber 220 movement along an x axis is inhibited. All or only a portion of the optical fiber 200 may be located within the groove 240 when viewed in cross-section.

As will be apparent to one of skill in the art, other groove shapes may also be used, such as a U-groove, including U-grooves with square or rounded lower corners. Grooves capable of receiving at least a portion of the optical fiber are within the scope of the invention. According to one example, the groove will provide contact with the optical fiber at least at two locations along the circumference of the optical fiber.

The substrate 250 may be formed of a wide variety of materials. Performance of the resulting device benefits by the use of substrate materials and groove-forming methods that provide a precise and accurate groove. Examples of substrate materials include Si, $SiO_2$, InP, GaAs, InGaAs, InGaAsP and the like.

Figure 10:
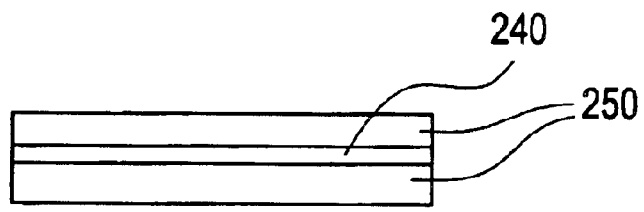
FIG. 10 illustrates a groove formed in a substrate according to an embodiment of the invention.

As will be apparent to one of skill in the art, the method of forming the groove 240 in the substrate 250 may vary according to the type of substrate material selected. As shown in FIG. 10, a sample embodiment of the invention provides the groove 240 by etching through a portion of a substrate 250. One example of forming the groove 240 involves wet-etching the groove 240 into a Si substrate. Other methods of forming the groove in the substrate will be apparent to one of skill in the art and are within the scope of the invention. Various examples of ways of forming the groove in a substrate are discussed in Madou, M. J., *Fundamentals of Microfabrication,* pp. 163–187, CRC Press, Boca Raton, Fla., 1997.

Figure 11A:
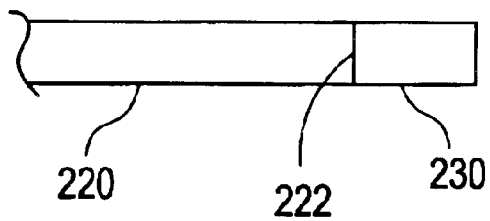
FIGS. 11A–11C illustrate various mountings of optical fibers to lenses.
Figure 11B:
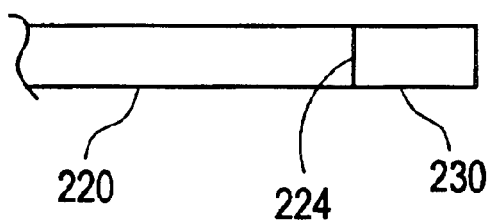

The lens 230 may be mounted to the optical fiber 220, such that the lens 230 and optical fiber 220 are optically coupled, in a variety of ways known to those in the art. As shown in FIG. 11A, one example of mounting is a fusion splice 222. FIG. 11B illustrates adhesive 224 as another example. The adhesive 224 is located and/or formulated to allow transmission of optical signals from the lens 230 to the optical fiber 220, while fixedly securing the lens 230 to the optical fiber 220. Although the invention is not so limited, examples of adhesives include ABLELUX, A4021T, and AA50T by ABLESTIK, of Rancho Dominguez, Calif. A further example of an adhesive is 301–2 by EPOXY TECHNOLOGIES of Billerica, Mass.

Figure 11C:
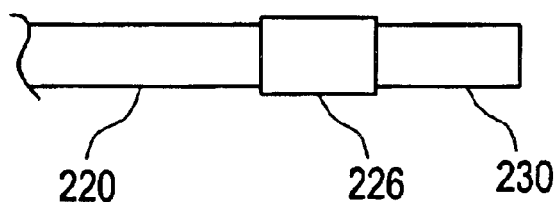

A further example of mounting the lens 230 to the optical fiber 220 is a clamp 226. An example of a clamp 226 is shown in FIG. 11C. According to the example of the invention, the clamp 226 is located outside of the groove 240 of the substrate 250. It will be apparent to one in the art that the clamp 226 may be a variety of mechanical devices capable of fixedly positioning the optical fiber 220 and lens 230 relative to each other. One example is a compression clamp.

The optical fiber 220 may be any optical fiber capable of allowing light to pass through. Examples include a single-mode fiber and a multi-mode fiber. The optical fiber 220 may be selected from a wide variety of sizes. According to one implementation of the invention, the diameter of the optical fiber is 125 microns±1 micron. The lens 230 may be a wide variety of optical lenses. An example is a graded index lens. As used herein, the term "light" includes any form of optical signal capable of transmission by optical fiber.

Figure 12A:
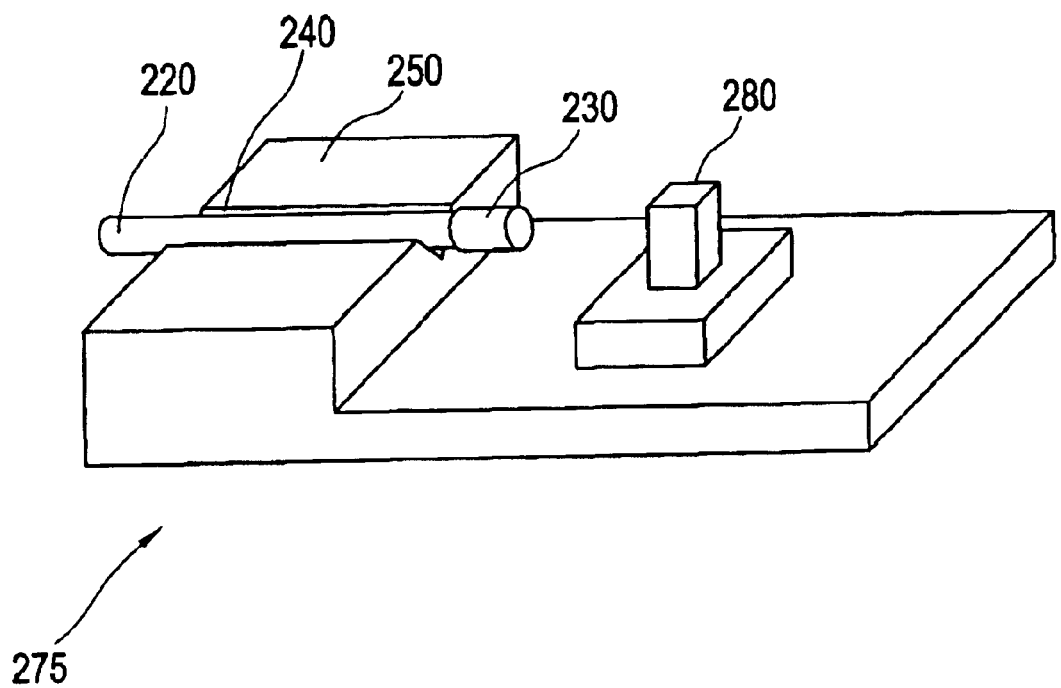
FIG. 12A illustrates an example laser device according to an embodiment of the invention.
Figure 12B:
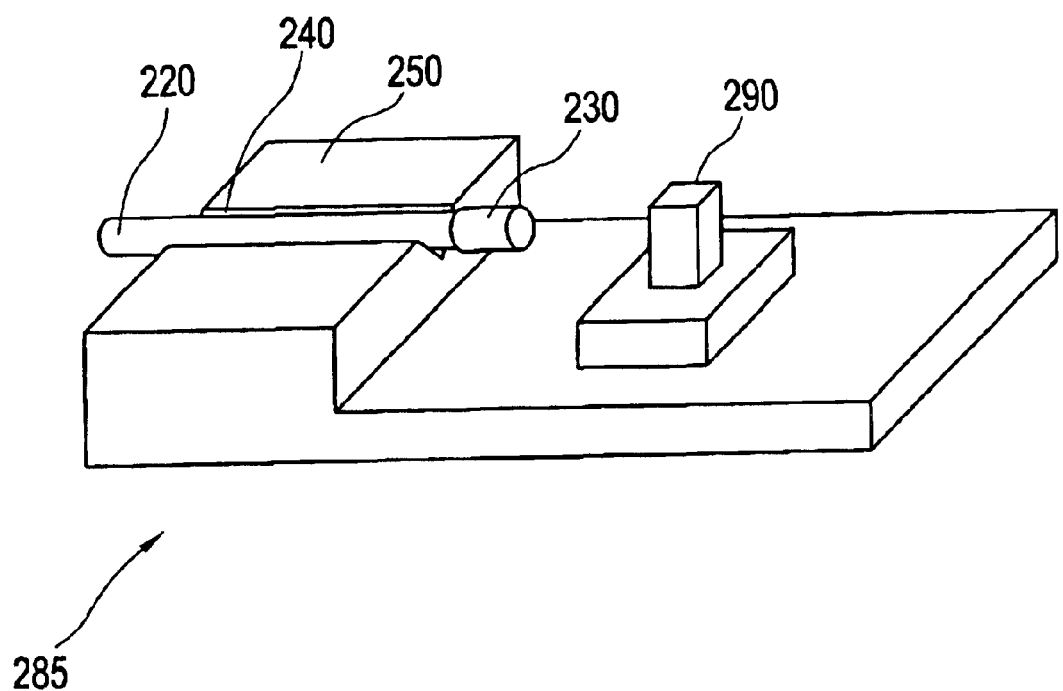
FIG. 12B illustrates an example photodetector according to an embodiment of the invention.

FIGS. 12A and 12B illustrate other embodiments of the invention. According to one embodiment, illustrated in FIG. 12A, a laser device 275 is provided by orienting the lens 230 toward a laser 280. The substrate 250 is provided with the groove 240 for locating the optical fiber 220. According to this embodiment, the laser 280 is fixedly located relative to the substrate 250 and oriented to providing at least a portion of its output into the lens 230. The lens 230 is selected and separated from the laser 280 to achieve a desired optical result of the laser light traveling into and through the optical fiber 220.

According to a further embodiment illustrated in FIG. 12B, a photodetector device is 285 provided. The substrate 250 is provided with the groove 240 for locating the optical fiber 220. A photodetector 290 is fixedly located relative to the substrate 250 such that the photodetector 290 receives at least a portion of any light emitted from the optical fiber 220 through the lens 230. The lens 230 is selected and separated from the photodetector 290 to achieve a desired optical result of any light emitted from the optical fiber 220 traveling to the photodetector 290.

Figure 13:
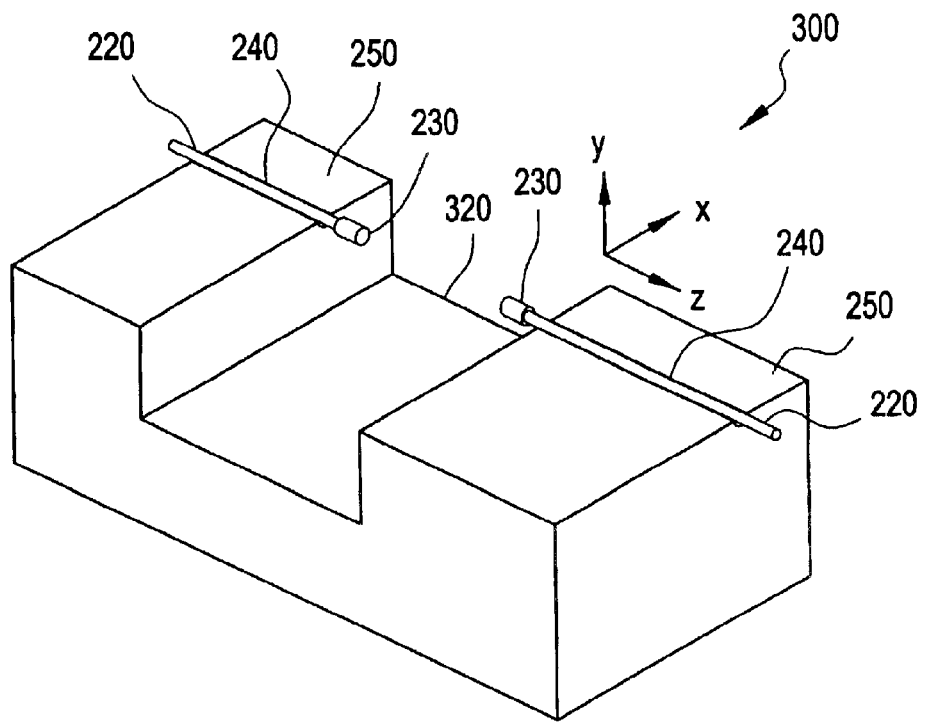
FIGS. 13 and 14 illustrates examples of optical coupling devices according to embodiments of the invention.

FIG. 13 shows an example of an optical coupling 300 according to a further embodiment of the invention. The optical coupling 300 is the functional equivalent of two lens positioning devices 200 oriented such that the lenses 230 are in optical communication with each other and are located outside of the grooves 240.

Figure 14:
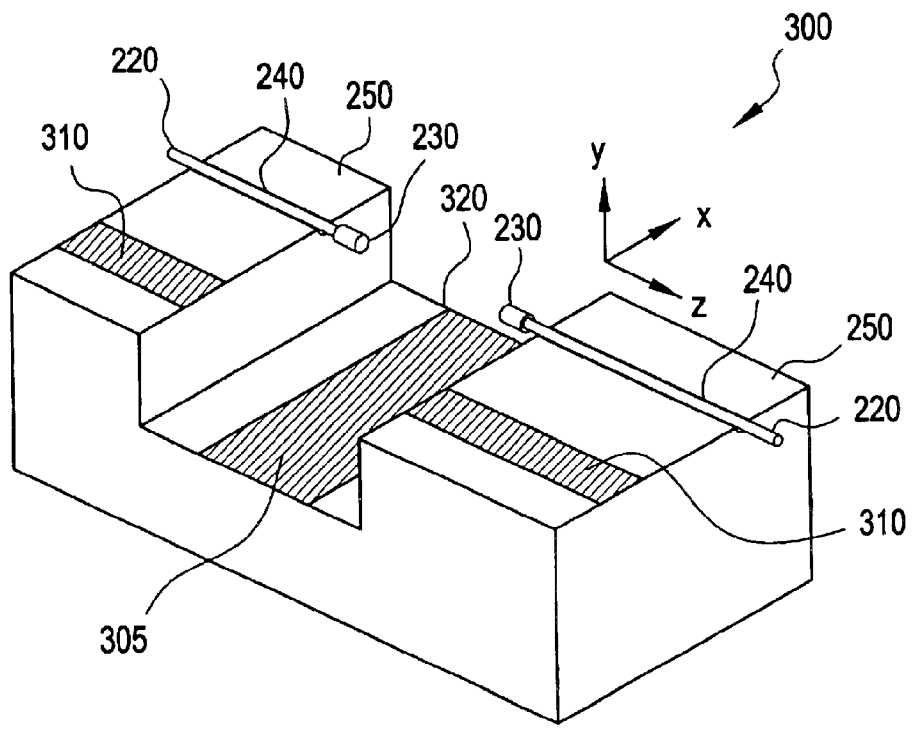

The substrate 250 of the optical coupling 300 may be a single, continuous piece, or may be two or more pieces fixedly mounted to each other. The optical coupling 300 may be formed to fixedly locate lenses 230, such as GRIN lenses, in optical communication with each other. As shown in FIG. 14, the optical coupling 300 may optionally be formed with solder plating 305 and/or one or more electrodes 310 and/or an alignment mark 320. The solder plating 305 and electrodes 310 may be formed of a variety of materials known in the art. Examples of the solder plating include Au—Sn, Sn and Pb—Sn. Examples of the electrodes include Cr/Au, Ti/Ni/Au and Cr/Cu/Au. Therefore, an example electrode may have Cr deposited on a substrate and Au as a second, outermost layer. Although the invention is not so limited, the other examples are three-layer electrodes, having Ti on a substrate, Ni as a second layer and Au as a top layer or Cr on a substrate and Cu and Au as second and third layers, respectively.

Figure 15:
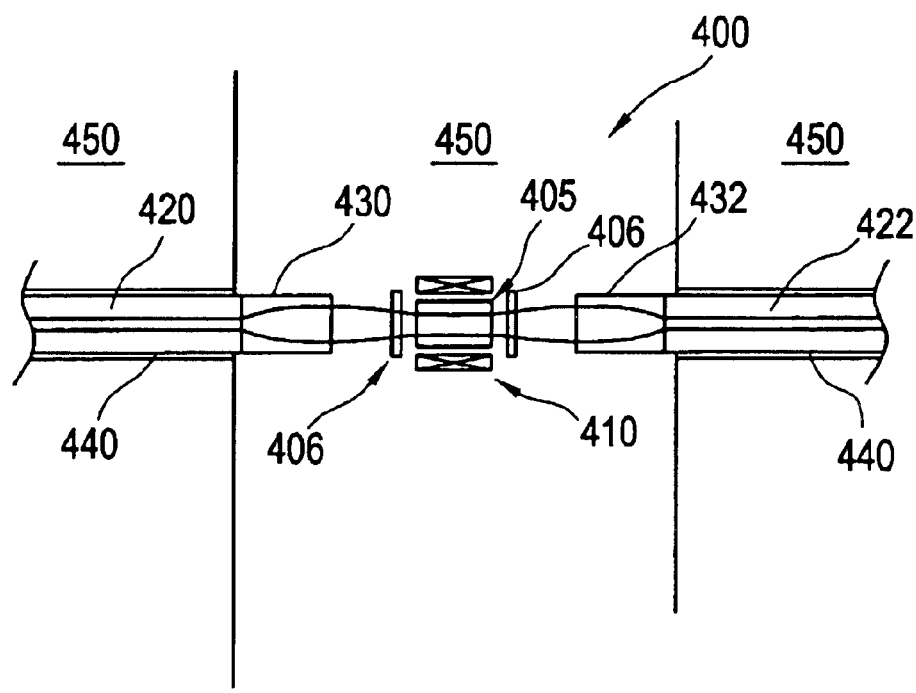
FIG. 15 illustrates an optical isolator according to an embodiment of the invention.

An optical isolator 400 is illustrated in FIG. 15. The optical isolator can allow light to pass from a first optical fiber 420 to a second optical fiber 422 and inhibit back reflection light. Lenses 430, 432, such as GRIN lenses, are mounted to the ends of the optical fibers 420, 422. The optical fibers 420, 422 are located in grooves 440 of substrate 450, while lenses 430, 432 are outside the grooves 440. Between the lenses 430, 432, a magneto-optical crystal 405 is provided. A cylindrical magnet 410 is provided along the magneto-optical crystal 405. Polarizers 406 are located between the lenses 430, 432 and the magneto-optical crystal 405. Upon activation of magnets 410 or rotation of the polarizers 406 relative to the magneto-optical crystal 405, the light transmitted through the magneto-optical crystal 405 can be adjusted. The magneto-optical crystal 405, magnet 410 and polarizers 406 are mounted to the substrate 450, which has a lower surface level than the portions of the substrate 450 having the grooves 440, such that the optical path between the lenses 430, 432 passes through the magneto-optical crystal 405 and polarizers 406.

Figure 16:
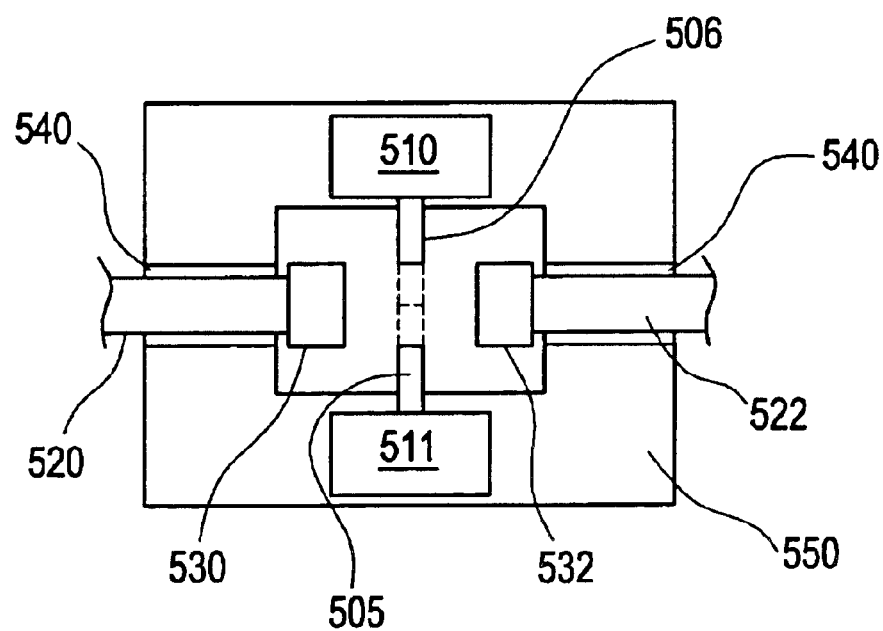
FIG. 16 illustrates an example optical attenuator according to an embodiment of the invention.

An example of an optical attenuator 500 according to another embodiment of the invention is shown by way of example in FIG. 16. This optical attenuator 500 provides a substrate 550 having grooves 540 to position optical fibers 520, 522. Lenses 530, 532 are mounted to ends of the optical fibers 520, 522. One or more shutters 505, 506 are positioned to selectively block the optical path between the lenses 530, 532. One or more shutters 505, 506 are moved in and out of the optical path by the use of one or more actuators 510, 511. Optionally, only a single shutter 506 and actuator 510 may be provided, such that the shutter 506 extends across the optical path between lenses 530, 532. For further detail regarding examples of actuators and substrate configuration that may be used with this implementation, please see U.S. Pat. No. 6,275,320, to Dhuler, et. al.

FIG. 17 illustrates a further example of an optical switch 600 using one or more mirrors 605 that can be selectively placed to redirect light. Optical fibers 620 are arranged in grooves 640 formed in substrates 650. Lenses 630 are mounted to a first end of the optical fibers 620, such that the lenses 630 are outside of the grooves 640.

With reference to FIG. 17, the example optical switch 600 operates as follows. By way of example, optical fiber 620A directs light into the optical switch 600. If mirror 605A has been moved up, the mirror 605A will redirect the light from the optical fiber 620 to optical fiber 620B. In FIG. 17, mirrors 605 in an up position are illustrated as a solid line, while mirrors 605 in a down position are illustrated in dashed lines. If the mirror 605A is down, light from optical fiber 620A will continue to travel to optional optical fiber 620C. In another example, light from optical fiber 620D will travel to optical fiber 620E and not be directed into optical fibers 620F, 620G, 620H or 620B, because each of the mirrors between optical fiber 620D and optical fiber 620E are down. Mirrors 605 may be moved from an up position to a down position by actuators. Although many types of actuators may be used with this embodiment of the invention, examples of actuators that may be used with this implementation, see U.S. Pat. No. 6,449,406 to Fan, et al.

Although FIG. 17 illustrates a matrix of mirrors 605 and corresponding optical fibers 620 and lenses 630, it is understood that the invention is not so limited. One or more mirrors 605 may be used and may be arranged linearly or some other pattern or randomly. Similarly, optical fibers 620, lenses 630 and grooves 640 may be arranged as desired.

The entire contents of each of the patents and publications cited herein are hereby incorporated herein by reference.

The present invention has been described by way of example, and modifications and variations of the described embodiments will suggest themselves to skilled artisans in this field without departing from the spirit of the invention. Aspects and characteristics of the above-described embodiments may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

What is claimed is:

1. An optical switch, comprising:

a substrate having a first groove;

a first optical fiber, located in said first groove;

a first lens mounted, at a first end, to an end of said first optical fiber, such that said first lens is located out of said groove and a space between said first lens and said substrate is formed; and a first mirror, coupled to said substrate and selectively located to obliquely face said first lens to be adapted to selectively redirect light traveling from said first lens wherein said first lens is a graded index lens.

2. The optical switch of claim 1, further comprising an actuator adapted to move said first minor between a first position and a second position, said first position within said substrate and said second position obliquely facing said first lens.

3. The optical switch of claim 1, further comprising a second groove in said substrate, parallel to said first groove.

4. The optical switch of claim 3, further comprising:

a second optical fiber, located in said second groove;

a second lens mounted, at a first end, to an end of said second optical fiber, such that said second lens is located out of said second groove and is held in position by said second fiber; and wherein said second lens is located to optically communicate with said first lens when said first mirror is not redirecting light traveling from said first lens.

5. The optical switch of claim 1, further comprising:

a third groove in said substrate;

a third optical fiber, located in said third groove;

a third lens mounted, at a first end, to an end of said third optical fiber, such that said third lens is located out of said third groove and is held in position by said third fiber; and wherein said third lens is located to optically communicate with said first lens when said first mirror is redirecting light traveling from said first lens.

6. The optical switch of claim 1, wherein said first lens is mounted to said end of said first fiber by a fusion splice.

7. The optical switch of claim 1, further comprising a plurality of first grooves, a plurality of first fibers, a plurality of first lenses and a plurality of first mirrors, such that said optical switch is arranged as matrix of first mirrors obliquely facing an array of first grooves, each of said plurality of said first grooves having a first fiber of said plurality of first fibers and a first lens mounted to said first fiber.

8. The optical switch of claim 7, wherein each of said plurality of first grooves is a V-groove.

9. A method of manufacturing an optical switch, comprising:

preparing a substrate having a first groove;

preparing a first optical fiber having a first lens at an end, wherein said first lens is a graded index lens;

locating said first optical fiber in said first groove;

locating said first lens out of said substrate, such that a spacing between said first lens and said substrate is formed; and preparing a first mirror coupled to said substrate and selectively located to obliquely face said lens to be adapted to selectively redirect light traveling from said first lens.

* * * * *